United States Patent [19]

Yamada et al.

[11] Patent Number: 4,733,363
[45] Date of Patent: Mar. 22, 1988

[54] CONTROL SYSTEM FOR COMBINATORIAL WEIGHING OR COUNTING APPARATUS

[75] Inventors: Seiji Yamada; Hideo Nobutsugu; Yukio Nakagawa, all of Kyoto, Japan

[73] Assignee: Ishida Scales Mfg. Co., Ltd., Kyoto, Japan

[21] Appl. No.: 883,389

[22] Filed: Jul. 8, 1986

Related U.S. Application Data

[63] Continuation-in-part of Ser. No. 668,894, Nov. 7, 1984.

[30] Foreign Application Priority Data

Nov. 8, 1983 [JP] Japan ................... 58-209623

[51] Int. Cl.⁴ .................. G01G 19/04; G01G 23/22; G01G 19/22
[52] U.S. Cl. ........................ 364/567; 177/1; 177/25; 177/70
[58] Field of Search ............ 364/567; 177/1, 25, 177/70, 123, DIG. 12

[56] References Cited

U.S. PATENT DOCUMENTS

| | | |
|---|---|---|
| 4,165,633 | 8/1979 | Raisanen . |
| 4,251,874 | 2/1981 | Check, Jr. . |
| 4,271,470 | 6/1981 | Dlugos et al. ............... 364/567 X |
| 4,410,962 | 10/1983 | Daniels et al. . |
| 4,418,771 | 12/1983 | Henry et al. . |
| 4,550,792 | 11/1985 | Mosher et al. ............... 177/1 X |
| 4,565,253 | 1/1986 | Berlebner et al. ............ 177/25 X |

FOREIGN PATENT DOCUMENTS

| | | |
|---|---|---|
| 0085446 | 8/1983 | European Pat. Off. . |
| 2424113 | 5/1978 | France . |
| 2425713 | 4/1979 | France . |
| 2098422 | 11/1982 | United Kingdom . |

OTHER PUBLICATIONS

MCS, 80/85, Family User's Manual, Intel Corporation, Jan. 1983.

Primary Examiner—E. A. Goldberg
Assistant Examiner—Patrick W. Foster
Attorney, Agent, or Firm—Staas & Halsey

[57] ABSTRACT

A control system for a combinatorial weighing or counting apparatus includes a main central processing unit for effecting a combinatorial arithmetic operation, and a plurality of individual drive unit central processing units. The drive unit central processing units are associated respectively with driver units of the weighing machines and connected to the main central processing unit for controlling the drive units, respectively. Operation commands delivered from the main central processing unit to the individual drive unit central processing units, are set by interrupt processes of the individual drive unit central processing units at all times.

The control system for the combinatorial weighing or counting apparatus includes a main computer for chiefly effecting a combinatorial arithmetic operation on weight data from a plurality of the weighing machines to select a combination of weighing machines including articles having an optimum added value with respect to a target value. The control system also includes other computers for controlling auxiliary operations such as a supply of articles to the weighing machines or a discharge of the articles therefrom; thus each of the main computer and the other computers carries out its own share of processing functions.

8 Claims, 26 Drawing Figures

CONTROL SYSTEM FOR COMBINATORIAL WEIGHING OR COUNTING APPARATUS

CROSS-REFERENCE TO RELATED APPLICATION

This application is a continuation-in-part of U.S. application Ser. No. 668,894, filed Nov. 7, 1984, which is assigned to the assignee of the subject application.

BACKGROUND OF THE INVENTION

The present invention relates to a control system for a combinatorial weighing or counting apparatus.

There have been used combinatorial weighing apparatus which operate by supplying articles to be weighed to weighing hoppers associated respectively with weighing machines, effecting a combinatorial operation on weights from the weighing machines with an arithmetic control unit, and opening the weighing hoppers of those weighing machines which give an optimum combination of added weights closest to a target weight as a result of the combinatorial operation, thus discharging the articles representing the optimum combination of added weights.

In the combinatorial weighing apparatus, the weighing hoppers which have discharged the articles, are immediately supplied with articles for a next weighing cycle from pool hoppers disposed above the weighing hoppers. The pool hoppers are supplied with distributed articles from a storage unit by means of an electromagnetic feeder. FIG. 1 of the accompanying drawings shows in block form such combinatorial weighing apparatus. Designated at 1 are a plurality of weighing machines W1 through Wn which issue weight values X1 through Xn (analog signals) to a multiplexer 2. When an arithmetic control unit 4 comprising a computer applies a signal S to the multiplexer 2 in response to a timing signal T from a packaging machine 5, the weight signals applied to the multiplexer 2 are successively fed to an A/D converter 3. The weight signals are converted by the A/D converter 3 into digital signals which are applied to the arithmetic control unit 4. The arithmetic control unit 4 stores the digital signals in a memory 6, reads a necessary command from the memory 6, effects combinatorial additions to find combinations of total weight values, compares the weight combinations with a target weight value Xs, and determines a combination of total weights which is closest to the target weight value Xs. If the combination of total weights does not exceed an upper weight limit setting Xu, then this combination of total weights is used as an optimum combination. With the optimum combination produced, the arithmetic control unit 4 applies a control signal C to a weighing machine driver 7 such as for the weighing hoppers or a discharge device, and then applies control signals to the electromagnetic feeder, the pool hoppers, and the weight hoppers.

Where the control system is composed of a central processing unit (CPU), and when the CPU runs out of control due to a noise signal, for example, the CPU is required to be reset by itself. However, no effective means has heretofore been available for resetting the CPU by itself. More specifically, a microcomputer generally starts its operation by reading a command from a ROM (read-only memory) into a CPU, as illustrated in FIG. 2 of the accompanying drawings.

When the CPU issues address signals to an address bus in the order to be executed, the ROM automatically delivers an instruction word to a data bus. Since the combinatorial weighing apparatus has an electromagnetic feeder actuated by SCRs (thyristors) which are phase-controlled, an electric noise signal tends to be applied to the CPU, so that a wrong instruction word is read. For example, where there are instruction words 1 through 4 composed by 3 bytes, 2 bytes, 2 bytes, and 3 bytes, respectively, as shown in FIG. 3(a), the instruction word 2 may be read as a 3-byte instruction word, as shown in FIG. 3(b), or an addressing command such as a CALL command or a JUMP command may be read in error, whereupon the microcomputer system will not operate properly.

In such a combinatorial weighing apparatus, a single computer controls the amount of articles to be supplied to the weighing machines from feeders, opening and closing of hoppers such as pool hoppers and weighing hoppers, zero point and span adjustments, and sampling of weighed values of articles in the weighing machines, and executes a combinatorial arithmetic operation. For this reason, when a new operating function is added to the computer, the function is processed only sequentially by the computer with a reduction in an entire processing capability of the computer. As a result, the combinatorial weighing apparatus does not have flexibility for alterations in design and specification, and the manufacturing cost thereof is expensive.

SUMMARY OF THE INVENTION

It is an object of the present invention to provide a control system for combinatorial weighing or counting apparatus, in which a program for controlling the control system including a microcomputer is composed of interrupt routines, so that each of a plurality of processes can be started with a proper address without any erroneous operation initiated by a noise signal after each process has been completed.

Another object of the present invention is to provide a control system for combinatorial weighing or counting apparatus, which includes a microcomputer system that can be reset by itself properly for each drive unit by resetting a correct interrupt wait address when an interrupt routine is started, to thereby restore a microcomputer, even if erroneous operation has been effected before the interrupt routine is started.

It is a still another object of the present invention to provide a control system for a combinatorial weighing apparatus having a main computer for principally executing a combinatorial arithmetic operation of the weight data from a plurality of weighing machines to select a combination of weighing machines including articles having an optimum added value with respect to a target value, and having other computers for controlling auxiliary operations such as a supply of articles to the weighing machines or a discharge of the articles therefrom, so that each of the main and other computers carries out its own share of processing functions.

According to the present invention, there is provided a control system for a combinatorial weighing or counting apparatus for weighing articles charged in a plurality of weighing machines, for effecting a combinatorial arithmetic operation on obtained weights or numbers of the articles converted from the weights, for selecting an optimum combination of added weights or numbers which are closest to a target combination, and for discharging the articles from those weighing machines which give the selected combination. The control system comprises a main central processing unit for effecting the combinatorial arithmetic operation, and a plurality of individual drive unit central processing units associated respectively with driver units of the weighing machines and connected to the main central processing unit for controlling the drive units, respectively. The arrangement is such that operation commands delivered from the main central processing unit to the individual drive unit central processing units are set by interrupt processes of the individual drive unit central processing units at all times.

Command signals from the main central processing unit to the individual drive unit central processing units are delivered through a data bus line connected to the main central processing unit.

The command signals from the main central processing unit to the individual drive unit central processing units are generated in synchronism with zero crossing points of an AC power supply for each of the drive units.

The individual drive unit central processing units are interconnected by a data highway connected to the main central processing unit by a data bus line.

According to the present invention, there is provided a control system for a combinatorial weighing or counting apparatus for weighing articles charged in a plurality of weighing machines, for effecting a combinatorial arithmetic operation on obtained weights or numbers of the articles converted from the weights, for selecting an optimum combination of added weights or numbers which are closest to a target combination, and for discharging the articles from those weighing machines which give the selected combination. The control system has a main computer for principally executing a combinatorial arithmetic operation for the weight data from a plurality of the weighing macines to select a combination of weighing machines including articles having optimum added value with respect to a target value, and other computers for controlling auxiliary operations such as a supply of articles to the weighing machines or a discharge of the articles therefrom, so that each of the main and other computers carries out its own share of processing functions.

The other computers comprise sub-computers disposed at each of a plurality of groups, each including a plurality of the weighing machines.

Further, the other computers comprise unit computers disposed at each of a plurality of the weighing machines for monitoring the weight data from the weighing machines.

Furthermore, the other computers monitor the weight data from each of the weighing machines.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Generally, a microcomputer starts executing an interrupt program when interrupted by an electric signal from an external source. Since an interrupt process has highest priority, and a start address of the interrupt program is prescribed, the interrupt process will not be started in error by noise.

Figure 1:
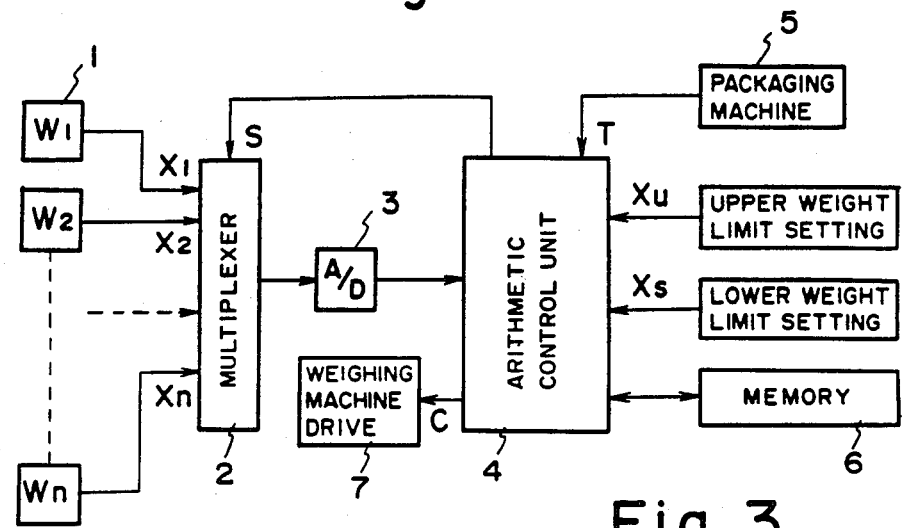
FIG. 1 is a block diagram of a combinatorial weighing apparatus.
Figure 2:
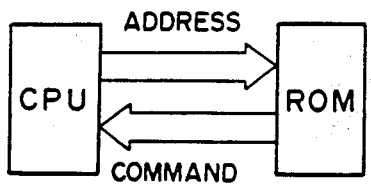
FIG. 2 is a diagram showing the basic relationship between a CPU and a ROM.
Figure 3:
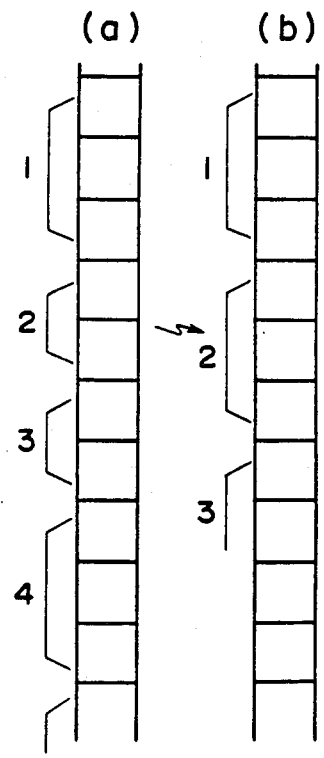
FIGS. 3(a) and 3(b) are diagrams for illustrating arrangements of instruction words.
Figure 4:
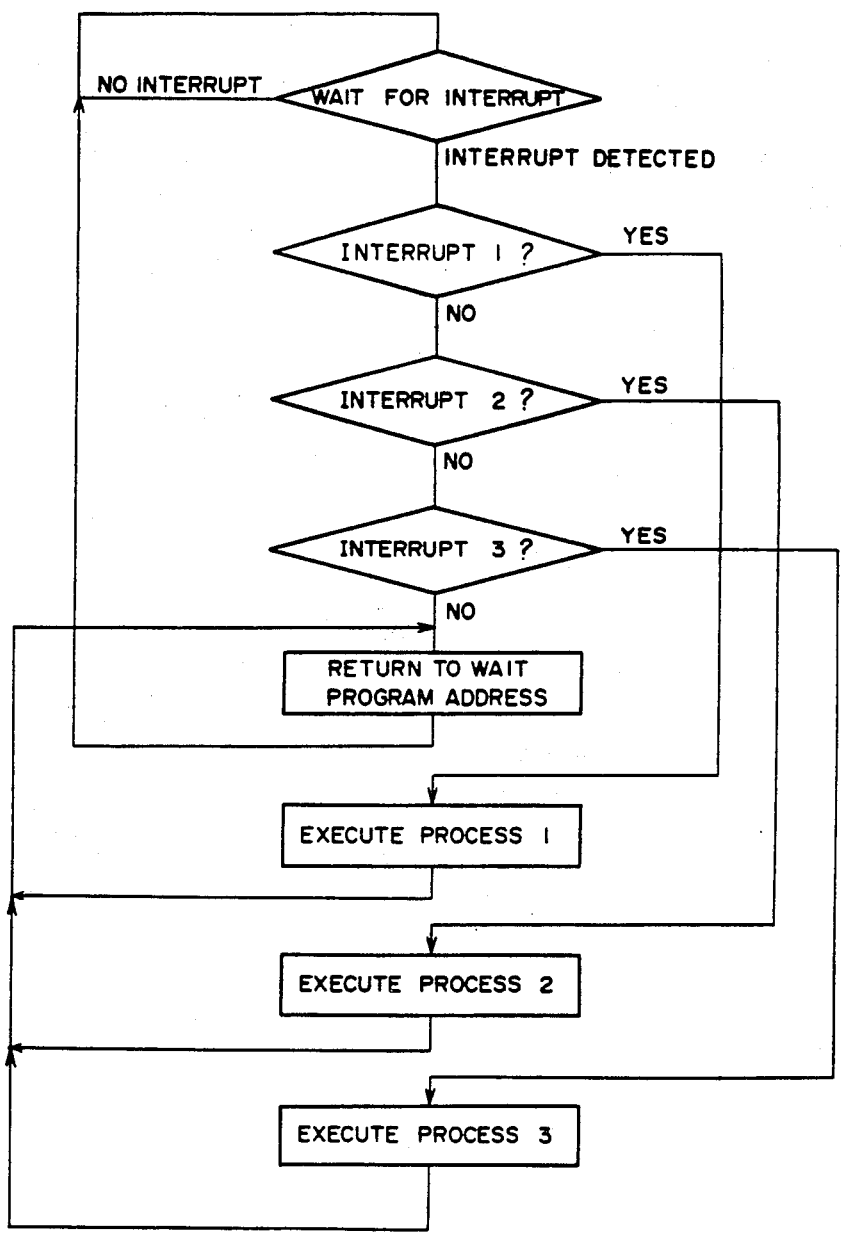
FIG. 4 is a flowchart for the procedure of interrupt processes according to the present invention.
Figure 5:
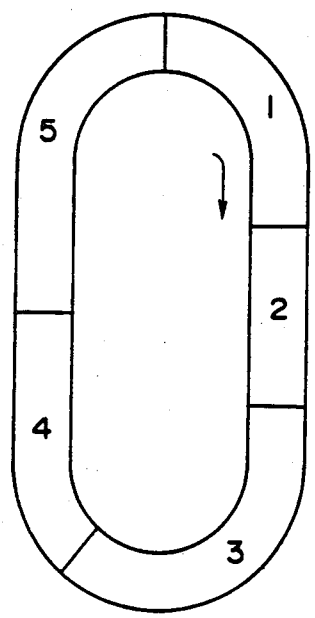
FIGS. 5 and 6 are diagrams for explaining the concepts of interrupt processes according to the prior art and the present invention.
Figure 6:
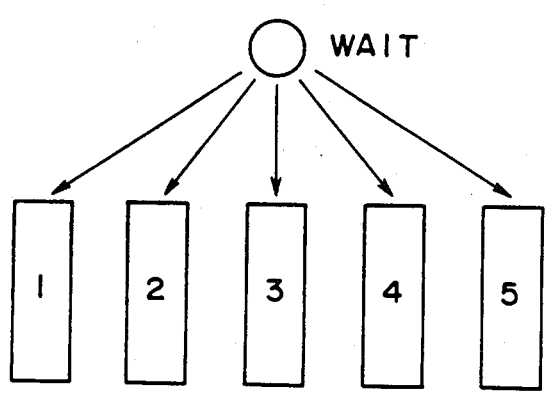
Figure 7:
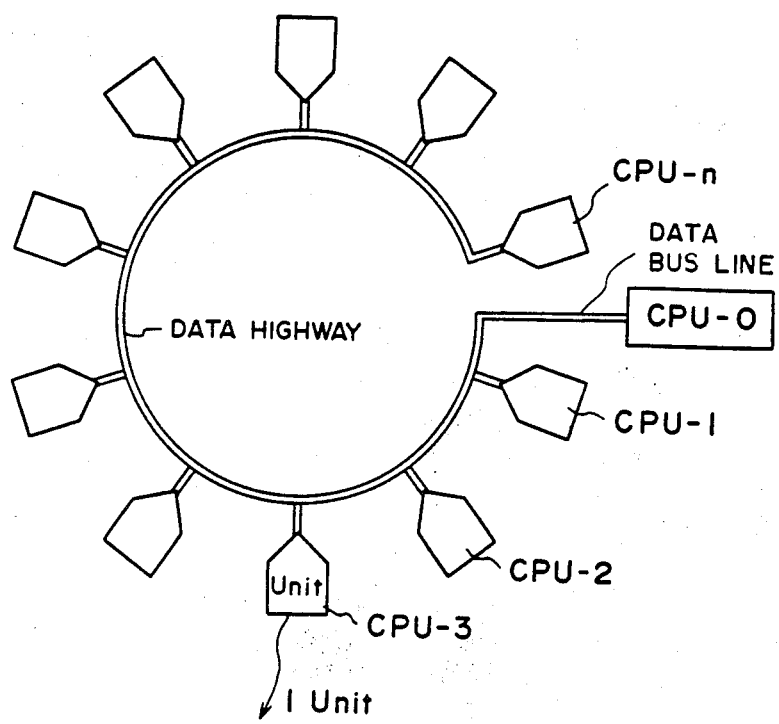
FIG. 7(A) is a schematic diagram of a control system for a combinatorial weighing apparatus to which the present invention is applied.
FIG. 7(B) is a diagram of one drive unit.
Figure 7:
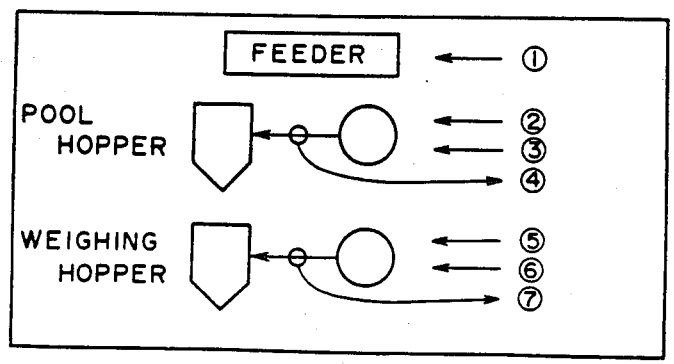

The present invention is based on such characteristics of an interupt program. FIG. 4 is a flowchart for a control procedure in accordance with the present invention. When an interrupt request 1 is given while waiting for an interrupt command, a CPU accepts the request and executes a process 1 according to a prescribed program. When the process 1 is completed, the CPU returns to an address of an interrupt wait program for waiting for an interrupt command. Then, the CPU executes processes 2, 3 in response to interrupt requests 2, 3, respectively, and thereafter returns to the address of the interrupt wait program. Such an interrupt procedure will be compared with a conventional interrupt procedure shown in FIG. 5. As shown in FIG. 5, interrupt requests 1 through 5 are successively accepted by a CPU which jumps to a certain address to execute a program. According to the present invention, independent interrupt wait addresses are established respectively for interrupt requests 1 through 5 (see FIG. 6). More specifically, a processing program to be executed by a microcomputer is all composed of interrupt programs, and a necessary procedure is started in response to an electric signal applied to an interrupt input terminal at all times.

An embodiment of the present invention will be described in greater detail with reference to FIGS. 7 through 10.

A combinatorial weighing apparatus to which the present invention is applied, has a plurality of independent drive units, and central processing units CPU-1 through CPU-n are associated respectively with the drive units and connected to a main CPU-0 for high-level processing operations. FIG. 7(A) schematically shows such a computer control system in which the drive unit CPUs (CPU1 through CPU-n) are interconnected by a data highway coupled by a data bus line to the main CPU (CPU-0).

Each of the drive units is constructed as shown in FIG. 7(B). Each drive unit is composed of a feeder time/feeder strength control device ①, a pool hopper clutch ②, a pool hopper brake ③, a pool hopper operation sensor ④, a weighing hopper clutch ⑤, a weighing hopper brake ⑥, and a weighing hopper operation sensor ⑦. A feeder is controlled by the feeder time/feeder strength control device ①, A pool hopper is operated with the pool hopper clutch ② and the pool hopper brake ③. The pool hopper operation sensor ④ ascertains whether the pool hopper has operated properly or not. A weighing hopper is operated with the weighing hopper clutch ⑤ and the weighing hopper brake ⑥. The weighing hopper operation sensor ⑦ ascertains whether the weighing hopper has operated properly or not.

Figure 8:
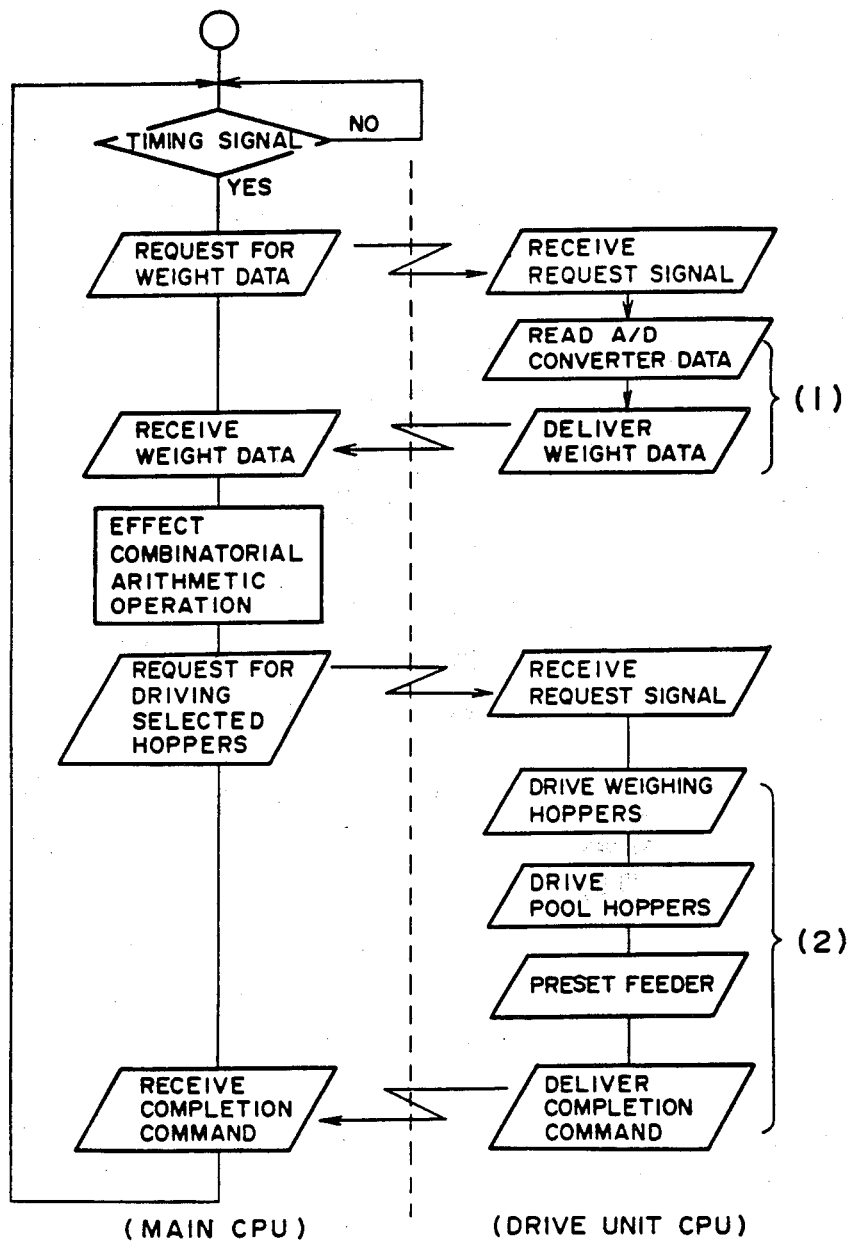
FIG. 8 is a flowchart for the processing operation of a main CPU and a drive unit CPU.

FIG. 8 is a flowchart of processes of operation of the main CPU (CPU-0) and the driver unit CPUs (CPU-1 through CPU-n) and their interrelationship. When a timing signal is given by the packaging machine to the main CPU, the main CPU delivers a weight data request signal to each of the driver unit CPUs. In response to such a weight data request signal from the main CPU, the driver unit CPUs read weight data from the respective weighing machines into the individual A/D converters and deliver each weight data to the main CPU {step (1)}. The main CPU stores the weight data, effects a combinatorial operation on the weight data, selects those weighing hoppers which give an optimum weight combination, and issues drive request signals to drive unit CPUs for driving the weighing machines. The drive unit CPUs, having received the request signals, drive the weighing hoppers, the pool hoppers, and preset the feeder, and, upon completion of such control, deliver a completion command to the main CPU {processing step (2)}.

Figure 9:
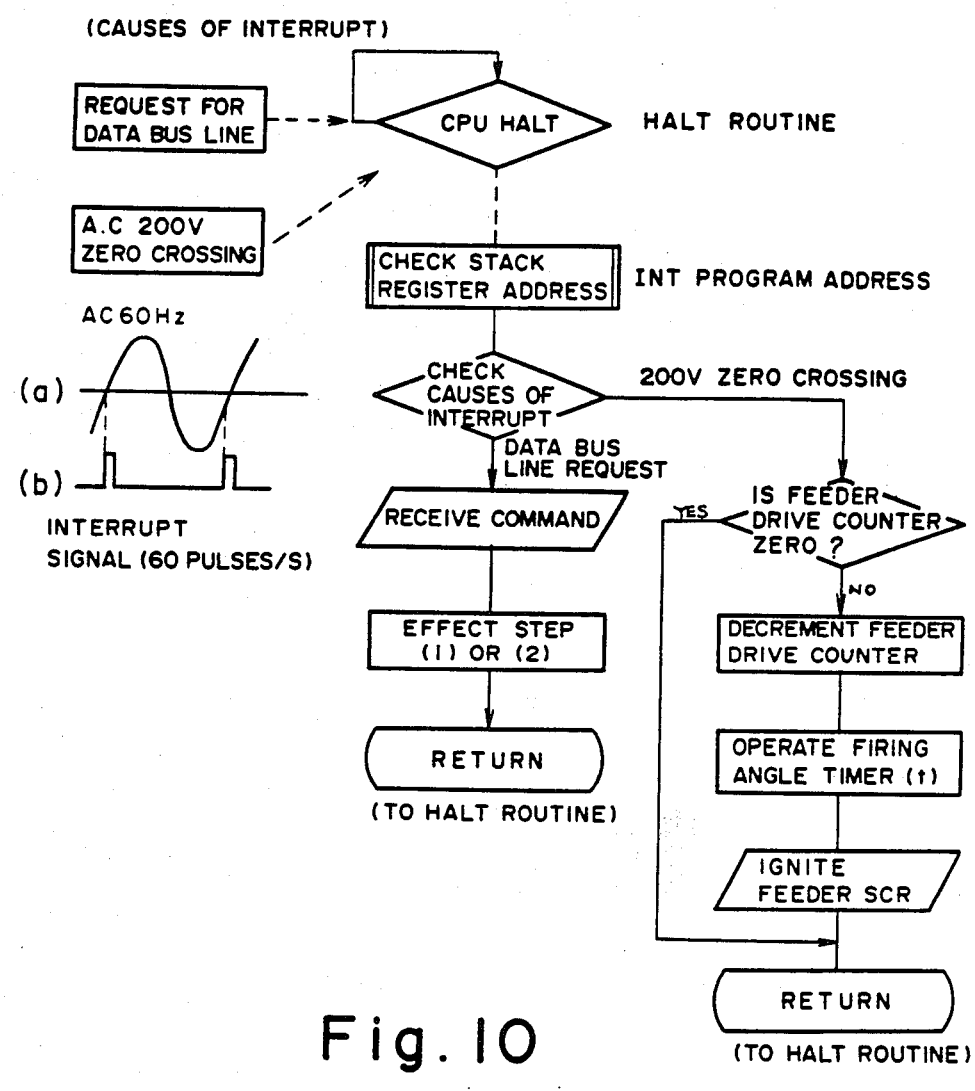
FIG. 9 is a flowchart for the interrupt procedure executed by the drive unit CPU.

FIG. 9 is a flowchart of specific details of the interrupt process of the drive unit CPU in each drive unit. The interrupt process is started by the request signal from the data bus line or a signal generated at a zero crossing point when an AC 200 V changes from a negative voltage to a positive voltage. The zero crossing point is detected from an AC power supply which drives the electromagnetic feeder. Therefore, where a power supply of 60 Hz is employed, 60 interrupt signals per second are generated. In normal operation, the interrupt signal is applied during a HALT routine of the CPU. Under abnormal conditions, however, the interrupt signal is applied while the CPU is running out of control. When the interrupt signal is applied, the drive unit CPU checks a stack register address to ascertain if the HALT condition of the CPU has been executed at normal addresses, for thereby confirming if the CPU has run out of control or not. If the CPU has run out of control, then the address is rewritten as a proper address, i.e., an address in the HALT routine, and input-/output ports are initialized.

Figure 10:
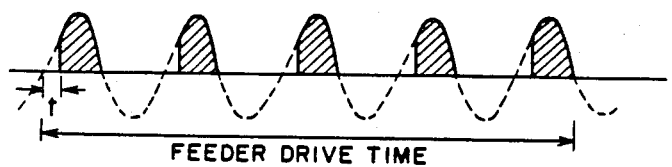
FIG. 10 is a diagram for illustrating of phase control of an SCR for controlling an electromagnetic feeder.

Then, the drive unit CPU checks what has caused the interrupt process. If the interrupt process is started by a data bus line request from the main CPU, then step (1) or step (2) is executed. After step (1) or step (2) has been executed, the drive unit CPU returns to the HALT routine. If the interrupt process is started by a 200-V zero crossing, then the drive unit CPU first ascertains if the count of a feeder drive counter is zero or not. If zero, then the drive unit CPU returns to the HALT routine. The feeder drive counter is set to a preset value in a feeder presetting step in the step (2) in FIG. 8, after a hopper drive command has been received. When the feeder drive counter is set to a numerical value, a firing angle timer for the SCR for driving the electromagnetic feeder, is actuated to ignite the SCR at a phase angle t, as shown in FIG. 10, and then the drive unit CPU returns to the HALT routine. The feeder operates during a prescribed time, or periods set by the drive counter. If the operation time is 0.3 second, then the feeder is driven in 18 periods in the case of a 60 Hz power supply. The operation continues until the count of the drive counter falls to zero. When the count of the drive counter becomes zero, the SCR is extinguished and the drive unit CPU returns to the HALT routine, as illustrated in FIG. 9.

The present invention will now be described with reference to a second embodiment shown in FIGS. 11–15 of the accompanying drawings.

Figure 11:
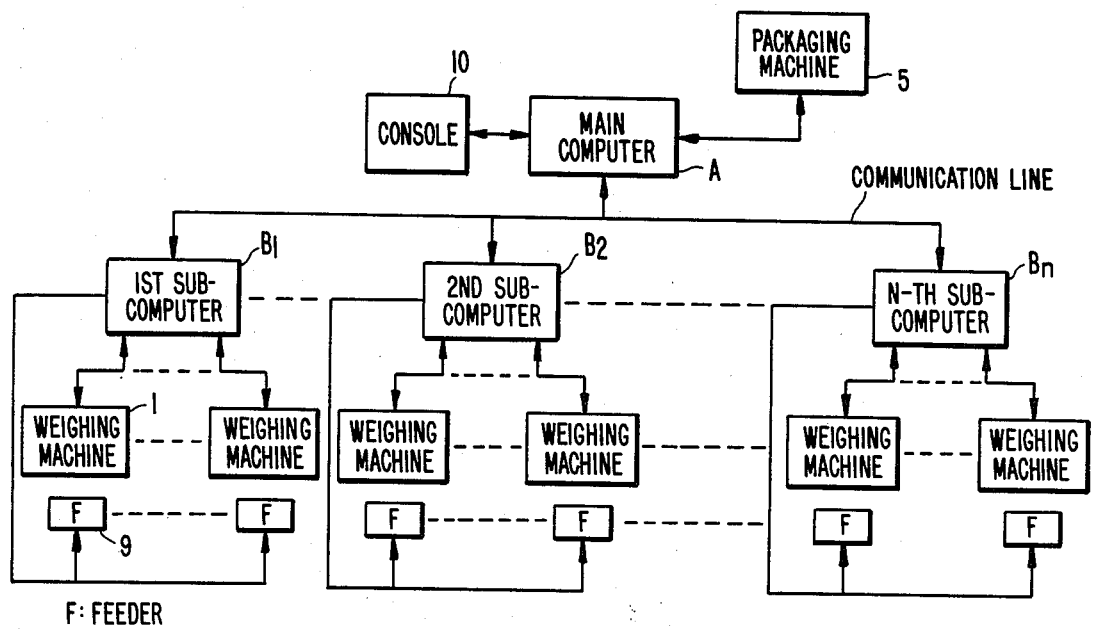
FIG. 11 is a block diagram of a second embodiment of a combinatorial weighing apparatus according to the present invention.

FIG. 11 is a block diagram of the second embodiment of the present invention. N sets in total of weighing machines 1 are divided into a plurality of groups and n sub-computers B1 . . . Bn are provided, one with each of the groups. Each of the sub-computers is connected with a main computer A through a communication line. The main computer is connected with a packaging machine 5 and a console 10.

Figure 12:
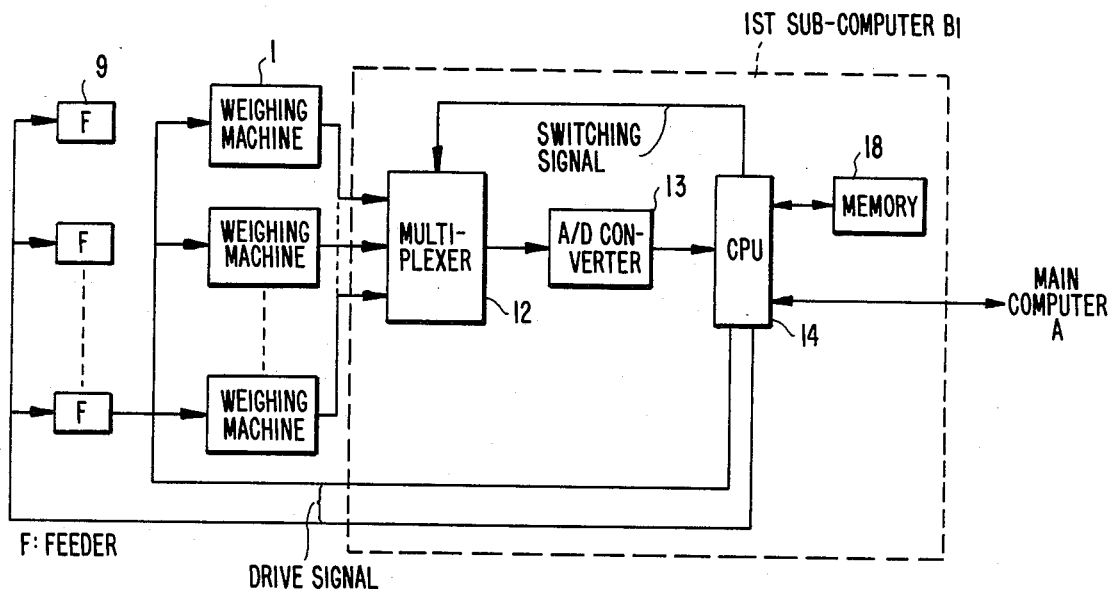
FIG. 12 is a block diagram of the arrangement of a sub-computer in accordance with the second embodiment.

FIG. 12 is a block diagram of the arrangement of the sub-computer B1 of the weighing apparatus shown in FIG. 11. As shown in FIG. 12, a central processing unit (CPU) 14 issues drive signals for feeders 9 for controlling the amount of articles to be supplied to each of the weighing machines 1 and drive signals for pool hoppers and weighing hoppers (both not shown). When the CPU 14 delivers a switching signal to a multiplexer 12, the weight data from the weighing machines 1 are converted into digital values by an A/D conveter 13 and sent to the CPU 14 to be stored in a memory 18. The weight data stored in the memory 18 is transmitted to the main computer A. The main computer A executes a combinatorial arithmetic operation based on the weight data from the sub-computers to select weighing machines giving an optimum combination. The main computer transmits the data to the sub-computers corresponding to the weighing machines which have been selected as giving the optimum combination, for opening the weighing hoppers thereof to discharge articles therefrom.

According to the second embodiment of the present invention, a total of N sets of the weighing machines are divided into a plurality of groups, and each group is provided with one sub-computer. The sub-computer controls the operation of the hoppers and feeders of the corresponding weighing machines, monitors the weight data from the weighing machines, and adjusts zero points and spans of the weighing machines.

Figure 13:
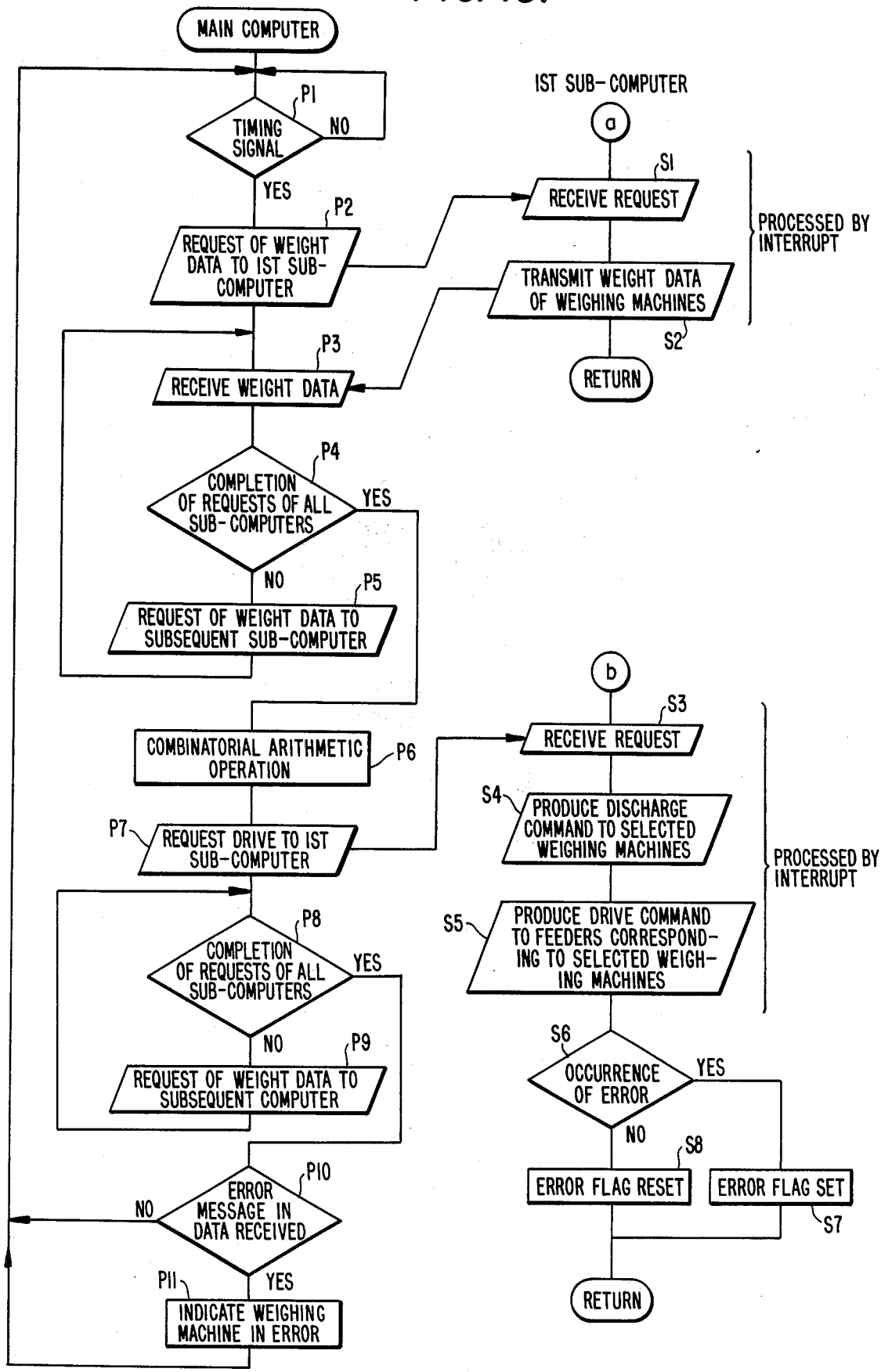
FIG. 13 is a flowchart of the processing performed in the second embodiment.

FIG. 13 is a flowchart of the processing performed by the second embodiment. The flowchart will now be described below.

(1) The main computer checks to see whether there is a timing signal from the packaging machine (step P1). If there is the timing signal, the main computer transmits a weight data request signal to a first sub-computer (step P2). The weight data at this time may include a flag for determining whether the data is obtained after the weighing machines have been stabilized, and an error message. When the first sub-computer receives the weight data request signal (step S1), the first sub-computer transmits the weight data from the weighing machines to the main computer (step S2). The steps S1 and S2 are processed by interrupt processes.

(2) When the main computer receives the weight data (step P3), the main computer requests a weight data to a subsequent sub-computer (step P5) and the main computer repeats the processings from the step 3 until the weight data requests to all of the sub-computers have been completed (step P4). When the main computer has completed the weight data requests to all of the sub-computers and received the weight data from the weighing machines, the main computer executes a combinatorial arithmetic operation based on the weight data (step P6). The combinatorial arithmetic operation at this time is executed on the basis of the weight data only from the weighing machines for which stabilization flags are set. When the weighing machines selected as giving the optimum combination are under control of the first sub-computer, the main computer transmits to the first sub-computer a signal for requesting the first sub-computer to produce a signal for discharging the articles from the weighing machines thus selected and a signal for driving the feeders (step P7). When the first sub-computer receives the signal (step S3), the first sub-computer produces a discharge command to the hoppers of the selected weighing machines for discharging the articles therefrom (step S4). The sub-computer produces a drive command to the feeders corresponding to the selected weighing machines for supplying articles thereto (step S5). The steps S3–S5 are processed by interrupt processes.

(3) After the main computer transmits a request signal for discharging the articles and a request signal for driving the feeders to the first sub-computer, the main computer produces to a 2nd . . . a n-th sub-computers, signals for requesting a discharge of articles from the weighing machines selected as giving the optimum combination and for requesting a drive of the feeders when the 2nd . . . n-th sub-computers include such weighing machines (step P9). When the main computer has completed the request signals to all of the sub-computers (step P8), the main computer checks to see whether the signals received include any error messages (step P10). The main computer executes the error check on the basis of the processing that when the first sub-computer confirms an error in the step S6, the first sub-computer sets an error flag (step S7), and when no error is caused, the main computer resets the error flag (step S8). If there is an error message, the main computer indicates a weighing machine causing the error (step P11) and returns to the step P1 to repeat the subsequent processings.

Figure 14:
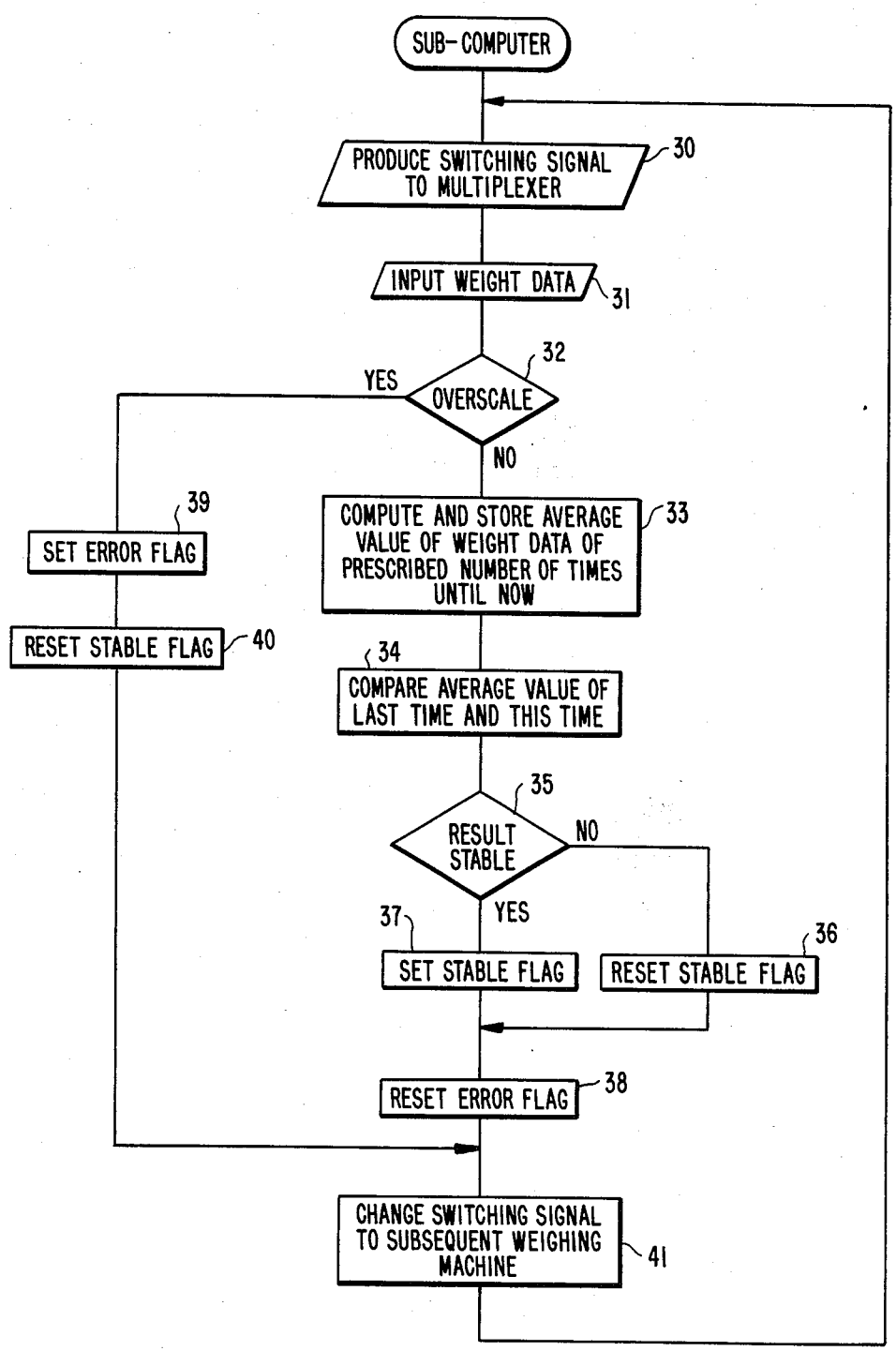
FIG. 14 is a flowchart of the processing performed by the sub-computer of the second embodiment.

FIG. 14 is a flowchart of the processing performed by the sub-computer. The flowchart will be described now.

(1) The central processing unit (CPU) of the sub-computer delivers a switching signal to the multiplexer (step 30) and enters the weight data from the weighing machines (step 31). Next, the central processing unit checks to see whether there is an overscaling (step 32). If there is no over-scaling, the central processing unit computes an average value of the weighing data of a prescribed number of times until then and stores the average value in the memory (step 33). The central processing unit compares the average value of the weight data obtained last time with the average value of the weight data obtained this time (step 34), for thereby checking to see whether the weighing operation is stable. (step 35).

(2) If the result of the comparison is stable, the central processing unit sets a stable flag (step 37). If the result of the comparison is not stable, the central processing unit resets the stable flag (step 36) and resets the error flag (step 38). If there is an overscaling in the weight data, the central processing unit sets the error flag (step 39) and resets the stable flag (step 40). Finally, the central processing unit changes the switching signal to a subsequent weighing machine (step 41) and repeats the processing from the step 30.

Figure 15:
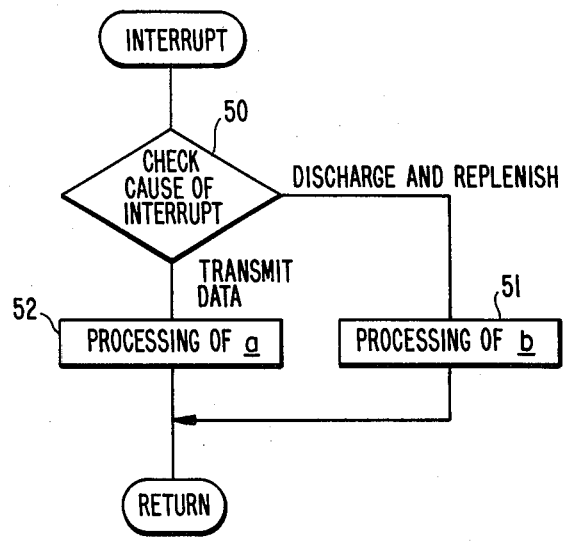
FIG. 15 is a flowchart of interrupt processes performed in the second embodiment.

FIG. 15 is a flowchart for the execution of interrupt processes. The sub-computer finds the reason why the interrupt processes are effected (step 50). If the interrupt processes are effected by a discharge processing or a replenishing processing, the sub-computer executes the processing shown in the flowchart b in FIG. 13 (step 51). If the interrupt processes are effected to transmit data, the sub-computer executes the processing shown in the flowchart a in FIG. 13 (step 52).

Each of the sub-computers gives a stable flag to the corresponding weighing machine to store weight data (average value) and transmits the weight data of the weighing machines to the main computer in response to a request from the main computer.

Figure 16:
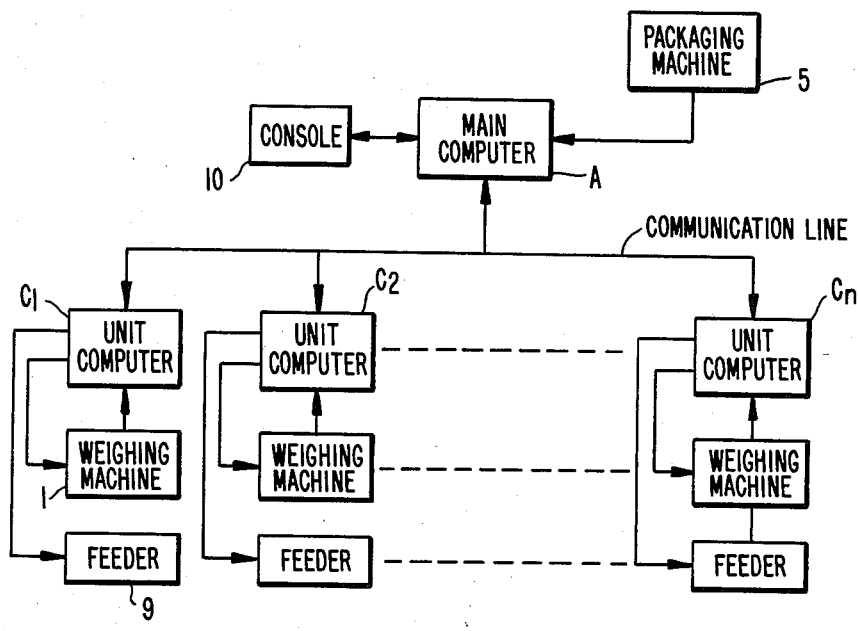
FIG. 16 is a block diagram of a third embodiment of a combinatorial weighing apparatus according to the present invention.
Figure 17:
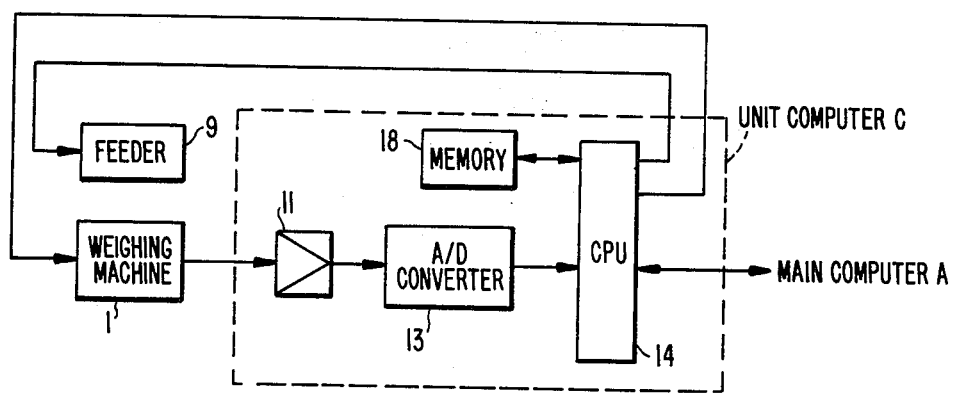
FIG. 17 is a block diagram of a unit computer of the third embodiment.

FIG. 16 is a block diagram of a third embodiment of the present invention. FIG. 17 is a block diagram of a unit computer of the third embodiment. The third embodiment is different from the second embodiment in that the weighing machines of the third embodiment are provided with unit computers C1 . . . Cn, respectively. As shown in FIG. 17, the unit computer has the arrangement such that the weight data from the weighing machines is transmitted to the central processing unit (CPU) 14 through an amplifier 11 and an A/D converter 13 to be temporarily stored in a memory 18. The main computer receives the stored weight data for executing a combinatorial arithmetic operation to thereby select weighing machines giving an optimum combination. More specifically, the third embodiment is different from the second embodiment only in that the unit computer of the third embodiment is coupled to each of the weighing machines, whereas the sub-computer of the second embodiment is coupled to a group of the weighing machines. The unit computer of the third embodiment is identical to the sub computer of the second embodiment in that the unit computer controls operation of the feeder and the hopper, monitors the weight data from the weighing machines, and adjusts the zero point and the span of the weighing machine. Therefore, a flowchart showing the processing of the third embodiment operation is omitted since the processing is substantially identical with that of the second embodiment.

In the third embodiment, since each of the weighing machines is provided with its own unit computer, sophisticated control of the weighing machine is ensured. The weighing machines may be replenished with articles at random or each of the weighing machines may be arranged such that the weighing machine operates as an independent automatic scale in accordance with a prescribed target weight value of articles to be supplied therefrom. The main computer executes a combinatorial arithmetic operation on the basis of the weight data from the weighing machines, ignoring weighing machines which have not completed a weighing operation or excluding such weighing machines.

According to the third embodiment, since the combinatorial arithmetic operation can be executed using the weighing machines which have completed the weighing operation quickly even if the weighing machines have different weighing speeds, the weighing speed of the entire system can be improved. Where the weighing machines operate as independent automatic scales, a weighing error can be reduced by using the combinatorial weighing method, the weighing error not being reduced by a single automatic scale. Thus, it is possible to improve the weighing accuracy of the entire system.

The sub-computers in the second embodiment and the unit computers in the third embodiment may be arranged such that the computers monitor the driving mechanisms of the weighing machines or the feeders at all times for thereby sounding an alarm when an accident happens.

Figure 18:
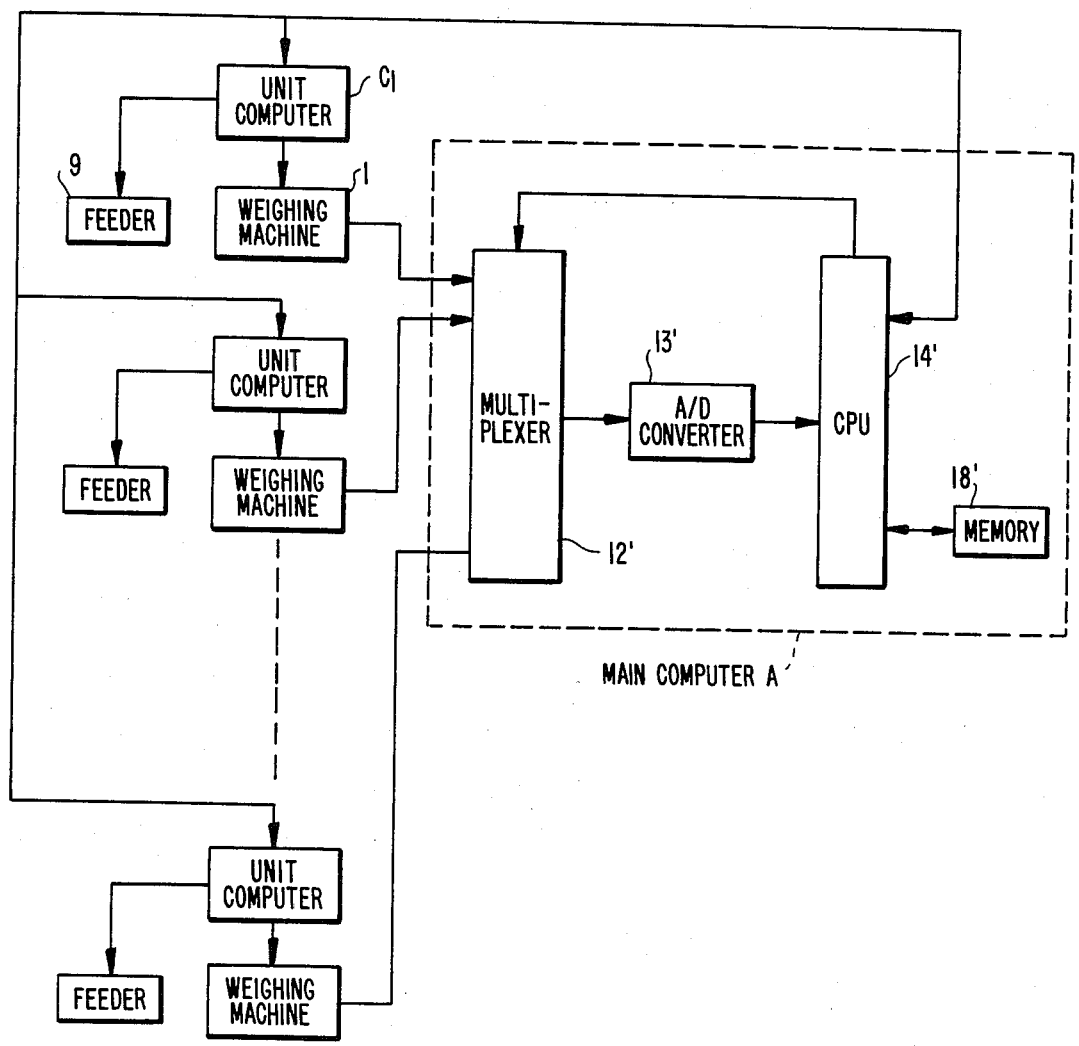
FIG. 18 is a block diagram of a fourth embodiment of a combinatorial weighing apparatus according to the present invention.

FIG. 18 is a block diagram of a fourth embodiment of the present invention. In the fourth embodiment, although a unit computer is coupled to each of the weighing machines in the same manner as the third embodiment, the fourth embodiment is different from the third embodiment in that the weight data from the weighing machine is transmitted directly to the central processing unit of a main computer A to be stored in a memory 18'. Therefore, in the fourth embodiment, the unit computer controls operation of the feeder and the hopper of the weighing machine and the main computer chiefly fetches weight data from the weighing machines, executes a combinatorial arithmetic operation, and selects weighing machines giving an optimum combination. FIG. 18 shows, by way of example, the unit computers each controlling a single weighing machine but the unit computer may be arrnged so as to control a plurality of the weighing machines in sequence.

Figure 19:
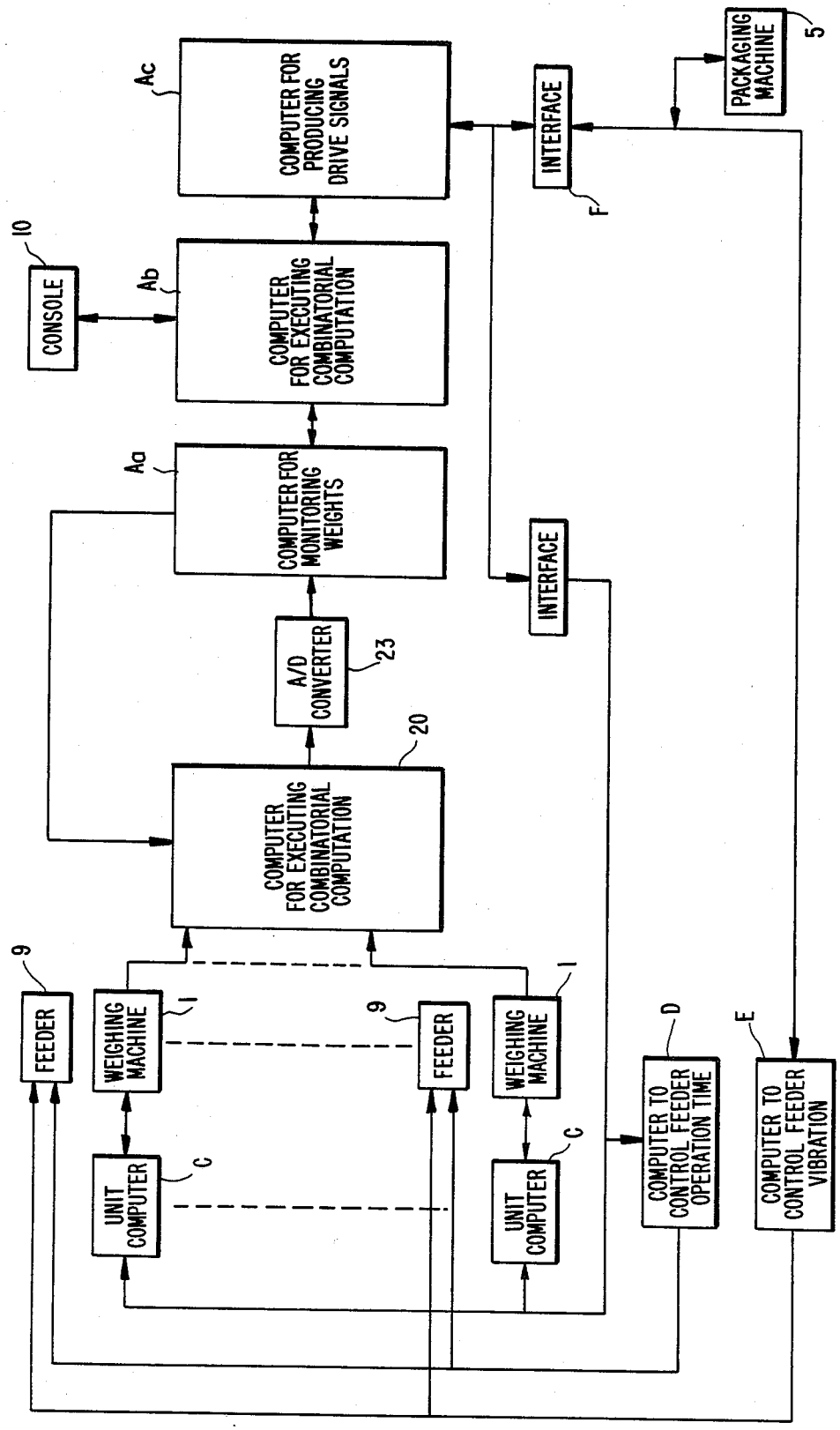
FIG. 19 is a block diagram of a fifth embodiment of a combinatorial weighing apparatus according to the present invention.

FIG. 19 is a block diagram of a fifth embodiment of the present invention. The fifth embodiment divides the functions of the main computer A shown in FIG. 18 into a function for monitoring the article weights, a function for executing a combinatorial arithmetic operation, and a function for issuing a drive command, these functions being assigned to independent computers, Aa, Ab, Ac. Each of unit computers C controls a weighing hopper, a pool hopper, and a storage hopper for storaging articles having been weighed (all of which not shown). Each of feeders 9 is provided with a computer D for controlling an operating period of the feeders 9 and a computer E for controlling the degree of vibration intensity of the feeders.

The computer Aa for monitoring article weights fetches the weight data from the weighing machines 1 at all times to thereby check to see whether the weighing machines are loaded or unloaded whether the weighing machines are stabilized. The computer Aa also adjusts the zero point and the span of the weighing machines 1 if requested by the computer Ab for executing the combinatorial arithmetic operation. The computer Ab for executing the combinatorial arithmetic operation (hereinafter referred to as a main computer) controls each of the aforementioned computers intensively in accordance with various kinds of modes set by a console 10, such as a data registration mode, a discharge mode in a normal operation and at a completion of the operation, a zero point adjustment mode, and a span adjustment mode. The main computer Ab combines the weight data of articles, which the main computer Ab has read from the computer Aa, in the weighing machines 1 being loaded with articles and in a stable condition, for thereby selecting the optimum combination of articles having the optimum weight closest to the target weight, and delivers to the computer Ac a command for discharging the articles in the selected weighing machines.

The computer Ac for producing a drive command is connected to a packaging machine 5 through an interface F to notify the start of the combinatorial arithmetic operation to the main computer Ab on receiving a start signal from the packaging machine 5. When the main computer Ab delivers a discharge command, the computer Ac transmits, according to a set timing, drive signals of the weighing hoppers and the pool hoppers of the weighing machines 1 thus commanded. In addition, the computer Ac transmits, according to a set timing, signals for controlling the operating period of time and the degree of vibration intensity of the feeders to the computers D and E.

Figure 20:
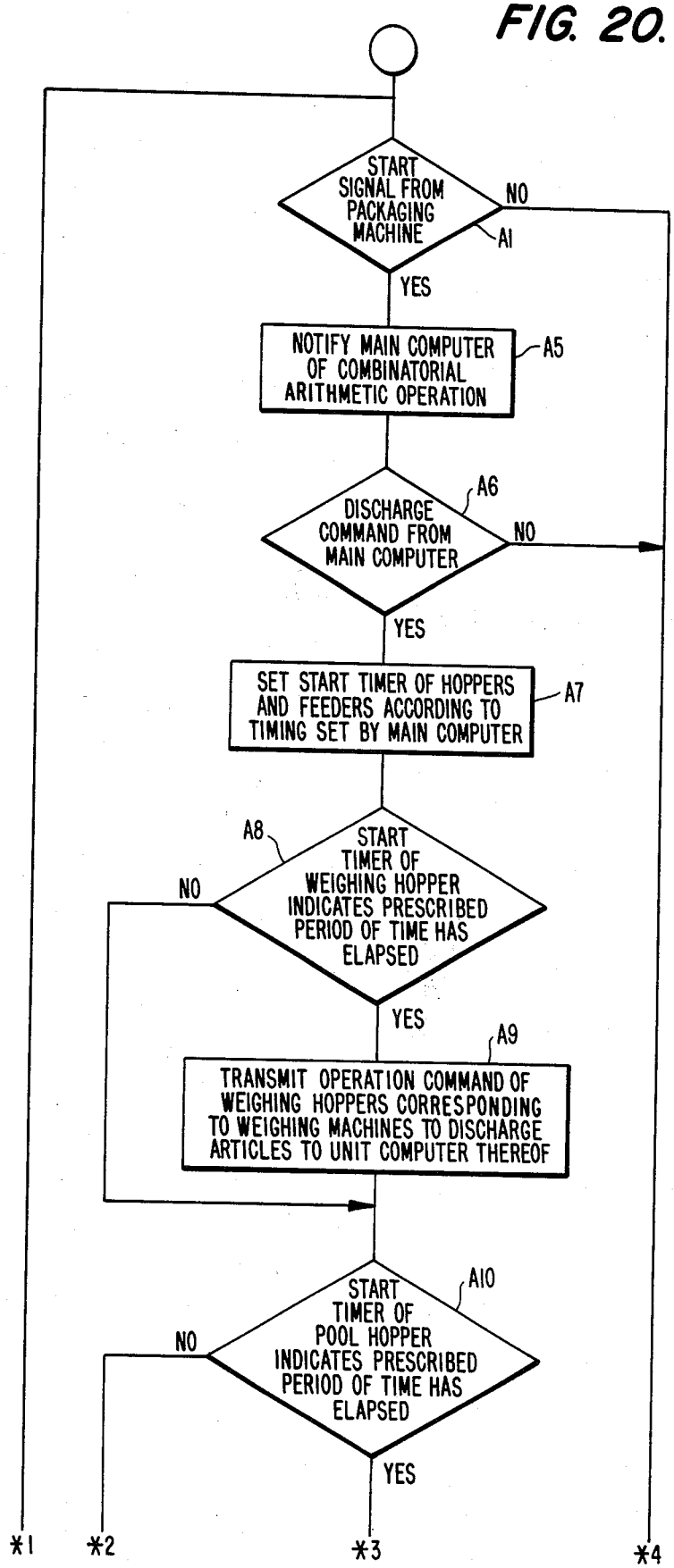
FIG. 20 is a flowchart of the operation sequences of a computer for producing drive commands.
Figure 20:
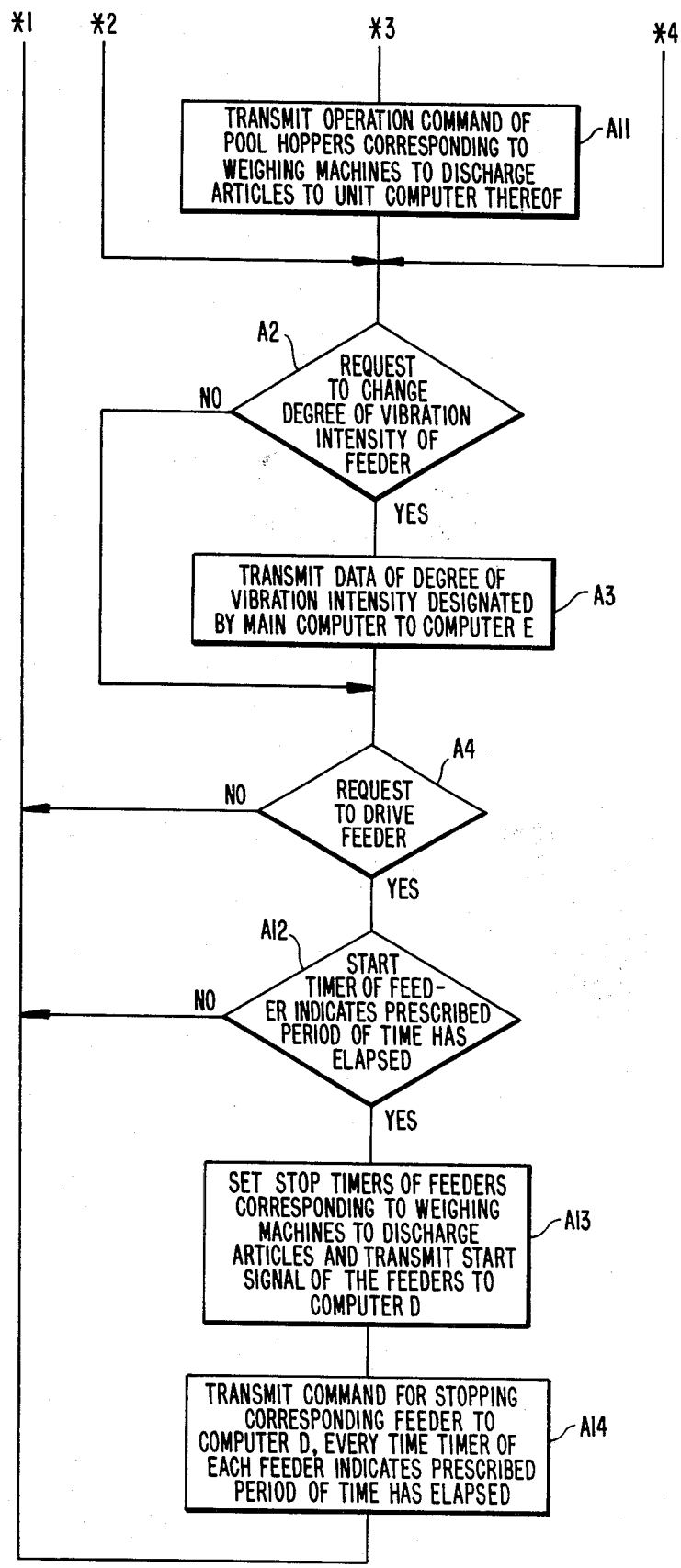

FIG. 20 is a flowchart for the operation sequences of the computer Ac for producing drive signals. The computer Ac checks to see whether there is a start signal from the packaging machine (step A1). When there is no start signal, the computer Ac checks to see whether there is a request for changing the degree of vibration intensity of the feeder which is set by the main computer Ab (step A2). If there is the request, the computer Ac communicates with the computer E for controlling the degree of vibration intensity of the feeder to transmit the designated data of the degree of vibration intensity of the feeder thereto (step A3). If there is no request for changing the degree of vibration intensity of the feeder, the computer checks to see whether there is a request to drive the feeder (step A4) bypassing step A3. If not, the computer returns from the step A4 to the initial step A1.

When the computer Ac confirms the start signal in the step A1, the computer Ac notifies the main computer Ab of the start signal (step A5) and waits for the result of a combinatorial arithmetic operation. When the main computer Ab produces a discharge command (step A6), the computer Ac sets the start timer of the weighing hoppers, the pool hoppers and the feeders according to a set timing indicated by the main computer Ab (step A7), to thereby control the hoppers and the feeders 9 in sequence according to the set timing.

More specifically, when the computer Ac confirms that the start timer of the weighing hopper indicates that a prescribed period of time has elapsed (step A8), the computer Ac transmits a command for operating the weighing hoppers to the unit computers C corresponding to the weighing machines 1 which are commanded to discharge articles by interrupt processes (step A9). When the computer Ac confirms that the start timer of the pool hopper indicates that a prescribed period of time has elapsed (step A10), the computer Ac transmits a command for operating the pool hoppers to the unit computer C corresponding to the weighing machines 1 in the same manner as mentioned in step A9 by interrupt processes (step A11). When the timer does not indicate that a prescribed period of time has elapsed, the computer Ac bypasses the corresponding steps A9 and A11.

When there is a discharge command, the result of the check in step A4 is YES, since a request to drive the feeder is set, and then the computer Ac checks to see whether the start timer of the feeder indicates that a prescribed period of time has elapsed (step A12). When the computer Ac confirms that the timer of the feeder indicates that the prescribed period of time has elapsed, the computer Ac sets the stop timers of feeders 9 associated with a discharge combination in response to a command from the main computer Ab and transmits by interrupt processes a start signal of the corresponding feeders to the computer D (step A13). In the subsequent step A14, the computer Ac checks to see whether the timers indicate that the prescribed period of time has elapsed. Every time the computer Ac confirms that the prescribed period of time has elapsed, the computer Ac transmits by interrupt processes a command to have the corresponding feeders 9 stop, to the computer D. More specifically, the computer Ac for producing a drive command controls the operating period of the feeders 9.

Figure 21:
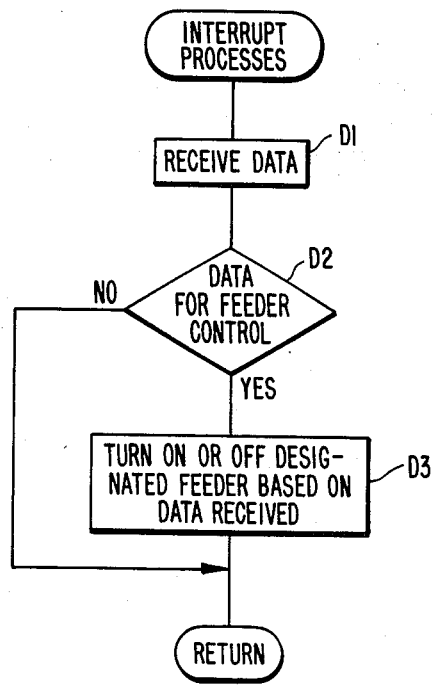
FIG. 21 is a flowchart of the principal operation sequences of a computer for controlling the operating period of feeders.

FIG. 21 is a flowchart of interrupt processes executed by the computer D for controlling the operating period of the feeders. When there is an interrupt, the computer D receives a signal transmitted (step D1) and checks to see whether there is data regarding feeder control (step D2). If there is data, the computer D turns on or off the designated feeders 9 based on the data received (step D3). If there is no data, the computer D bypasses step D3 and returns to the initial step.

Figure 22:
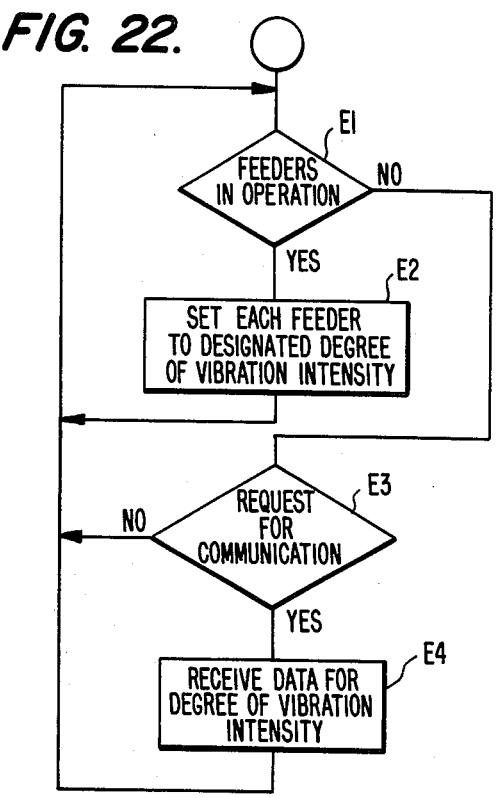
FIG. 22 is a flowchart of the principal operation sequences of a computer for controlling the degree of vibration intensity of the feeder.

FIG. 22 is a flowchart of processing executed by the computer E for controlling the degree of vibration intensity of the feeders 9. The computer E checks to see whether the feeders 9 are in operation (step E1). When the feeders 9 are in operation, the computer E sets the feeders 9 to a designated degree of vibration intensity (step E2). When the feeders 9 are not in operation, the computer E checks whether the computer Ac produces a request for communication (step E3). If there is a request for communication, the computer E receives data for the degree of vibration intensity of the feeders by a hand shake method (step E4). If there is no request for communication, the computer returns to the initial step E1 for checking the feeder operation.

Figure 23:
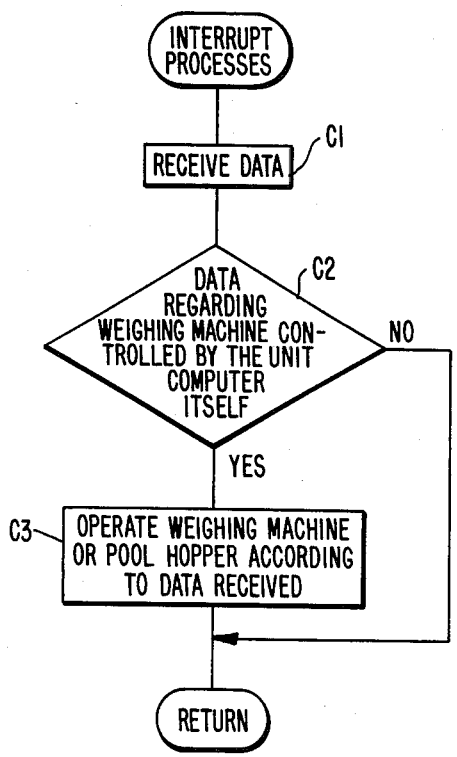
FIG. 23 is a flowchart of the interrupt processes of the unit computer.

FIG. 23 is a flowchart of interrupt processes executed by the unit computer C. When there is an interrupt, the unit computer C receives a signal transmitted (step C1) and checks to see whether there is data regarding e weighing machine controlled by itself (step C2). If there is the data, the unit computer C operates the weighing hopper or the pool hopper in accordance with the content of the data received in step C3. If there is no data, the unit computer C bypasses step C3 and returns to the initial step.

Figure 24:
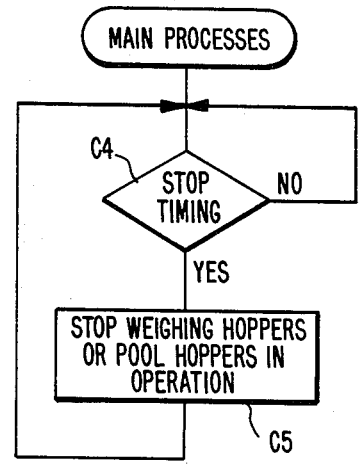
FIG. 24 is a flowchart of the main processings performed by the unit computer.

FIG. 24 is a flowchart of an example of main operation sequences of the unit computers C. The unit computer monitors the angular movement of a cam mounted on the hopper driving mechanism at all times for determining a timing at which a brake is applied (step C4), and the unit computer stops the weighing hopper or the pool hopper (step C5) when the unit computer detects the timing for applying the brake.

Although the flowchart does not show it, if the unit computer C does not detect the timing for applying the brake even when a predetermined period of time has elapsed after the weighing or pool hopper has started operation, the unit computer C transmits to the computer Ac an error signal indicating that the hopper has malfunctioned.

While the present invention has been described as being applied to a combinatorial weighing apparatus, the invention should not be interpreted as being limited to the combinatorial weighing apparatus. For example, the present invention may be applied to a combinatorial counting apparatus in which the weights of articles in the weight hoppers are converted into the numbers of articles, a combinatorial arithmetic operation is effected on the numbers of articles, and an optimum combination of added numbers is obtained, which is equal or closest to a preset target number.

Although a certain preferred embodiment has been shown and described, it should be understood that many changes and modifications may be made therein without departing from the scope of the appended claims.

What I claim is:

1. A control system for a combinatorial weighing or counting apparatus for weighing articles charged in a plurality of weighing machines having hoppers and feeders, for effecting a combinatorial arithmetic operation on obtained weights or numbers of the articles converted from the weights, for selecting an optimum combination of added weights or numbers having an optimum added value which is closest to a target value within preset limits, and for discharging the articles from those weighing machines which give the selected optimum combination, said control system comprising:
    a plurality of subcomputers, each provided for a group of weighing machines which are divided into a plurality of groups, for controlling the operation of the hoppers and feeders of the corresponding weighing machines, monitoring weight data from the weighing machines, and adjusting zero points and spans of the weighing machines; and
    a main computer coupled to said subcomputers via a communication line for executing sa combinatorial arithmetic operation based on the weight data from said subcomputers to select weighing machines giving an optimum combination, transmitting data to said subcomputers corresponding to the weighing machines which have been selected as giving the optimum combination to discharge articles therefrom and for operating the feeders corresponding to said selected weighing machines for charging articles thereto, the operation commands delivered from said main computer to said subcomputers.

2. A control system according to claim 1, wherein each of the weighing machines has a drive unit, wherein each of said drive units is connected to an AC power supply, and wherein the operation commands from said main computer to said subcomputers are generated in synchronism with zero crossing points of the AC power supply for each of said drive units.

3. A control system according to claim 1, wherein said subcomputers comprise unit computers respectively coupled to the weighing machines.

4. A control system according to claim 1, wherein said main computer is formed by a microcomputer.

5. A control system according to claim 1, wherein said subcomputers as formed by microcomputers.

6. A control system according to claim 3, wherein said unit computers are formed by microcomputers.

7. A control system for a combinatorial weighing or counting apparatus for weighing articles charged in a plurality of weighing machines including hoppers and feeders, for effecting a combinatorial arithmetic operation on obtained weights or numbers of the articles converted from the weights, for selecting an optimum combination of added weights or number having an optimum added value which is closest to the target value within preset limits, and for discharging the articles from those weighing machines which give the selected optimum combination, said control system comprising:

a plurality of unit computers, a respective one of said unit computers provided for each of the weighing machines, for controlling the operation of the feeders of the weighing machines and adjusting zero points and spans of the weighing machines; and a main computer, coupled to said unit computer via a communication line, for executing a combinatorial arithmetic operation based on weight data for selecting weighing machines giving an optimum combination, transmitting data to said unit computers corresponding to the weighing machines which have been selected as giving the optimum combination, discharging articles therefrom, and operating feeders corresponding to the selected weighing machines for charging articles thereto, the operation commands delivered from said main computer to said unit computers.

8. A control system according to claim 7, wherein said main computer comprises a computer for monitoring weight data, a computer for effecting a combinatorial arithmetic operation, and a computer for producing drive commands, and wherein each of said feeders is provided with a computer for controlling an operating period thereof and a computer for controlling the degree of vibration intensity thereof.

* * * * *

UNITED STATES PATENT AND TRADEMARK OFFICE
CERTIFICATE OF CORRECTION

PATENT NO. : 4,733,363

DATED : MARCH 22, 1988

INVENTOR(S) : SEIJI YAMADA ET AL.

It is certified that error appears in the above-identified patent and that said Letters Patent is hereby corrected as shown below:

FRONT PAGE [57] ABSTRACT, line 22, "therefrom; thus" should be --therefrom. Thus,--.

Col. 3, line 36, "macines" should be --machines--.

Col. 12, line 54, "sa" should be --a--.

Signed and Sealed this

Twenty-third Day of August, 1988

Attest:

DONALD J. QUIGG

*Attesting Officer*     *Commissioner of Patents and Trademarks*